United States Patent [19]

Solury

[11] 4,059,893

[45] Nov. 29, 1977

[54] COAXIAL CABLE CUTTING TOOL
[76] Inventor: Thomas F. Solury, 150 Colony Drive, Sierra Madre, Calif. 91024
[21] Appl. No.: 706,790
[22] Filed: July 19, 1976
[51] Int. Cl.² .............................................. H02G 1/12
[52] U.S. Cl. .................................... 30/90.1; 81/9.5 R
[58] Field of Search ....................... 30/90.1; 81/9.5 R
[56] References Cited
U.S. PATENT DOCUMENTS

| 3,620,104 | 11/1971 | Horrocks | 30/90.1 X |
|---|---|---|---|
| 3,623,384 | 11/1971 | Murphy | 81/9.5 R |

FOREIGN PATENT DOCUMENTS

| 2,313,125 | 9/1974 | Germany | 81/9.5 R |

Primary Examiner—Gary L. Smith
Assistant Examiner—James G. Smith
Attorney, Agent, or Firm—D. Gordon Angus; Donald D. Mon

[57] ABSTRACT

A rotatable tool for cutting and stripping insulation from coaxial cable to expose the conductors of the cable for attachment to a connector, comprises a housing containing spaced grooves extending transversely across the axis of rotation of the tool, each of the grooves containing a pair of opposed cutter blades. A central bore is provided coaxial with the axis of rotation through which a length of cable to be cut and stripped is inserted. Springs are provided for urging the cutting edges of the blades apart so that the cable can be passed between them without being cut. A race at the exterior of the housing is slidable back and forth in the axial direction and normally held in a neutral position by the spring action. When the race is moved axially in one direction, it functions to push one set of cutter blades toward each other to make a first cut which results in exposing a short length at the end of the central conductor and when the race is pushed in the other direction, it makes a second cut which cuts through the outer insulation and the outer conductor to the outer surface of the inner insulation. The part of the cable between each cut and the end of the cable can then be stripped off so that a conventional connector can be attached.

16 Claims, 14 Drawing Figures

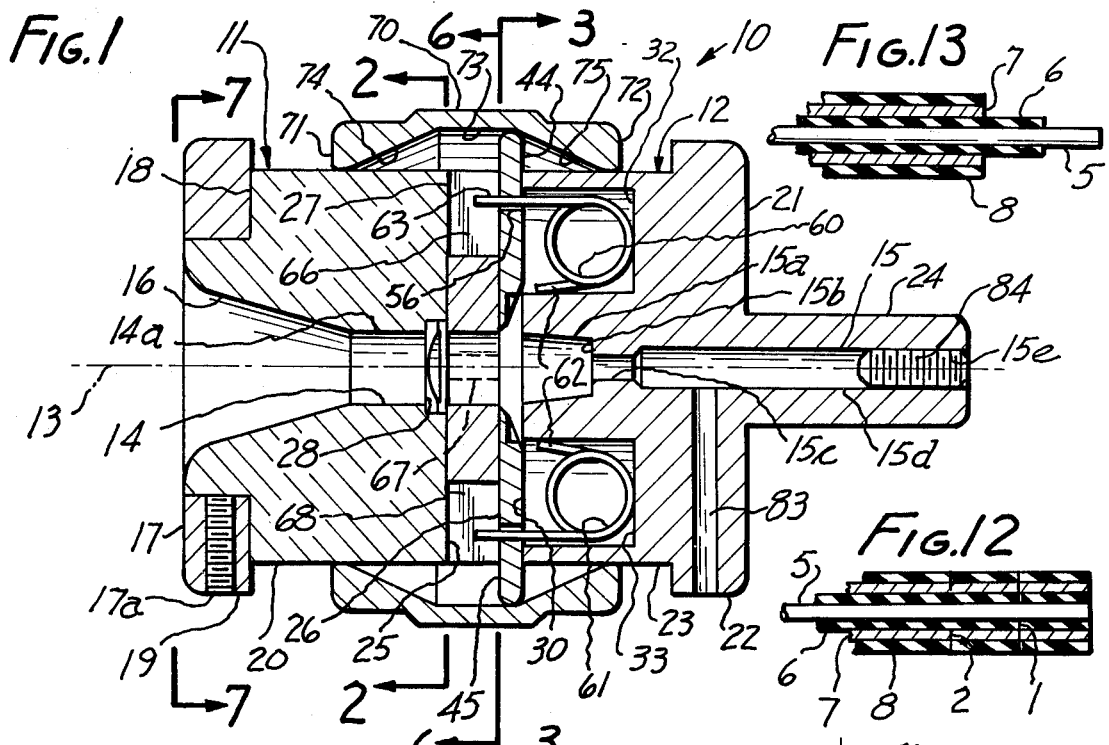
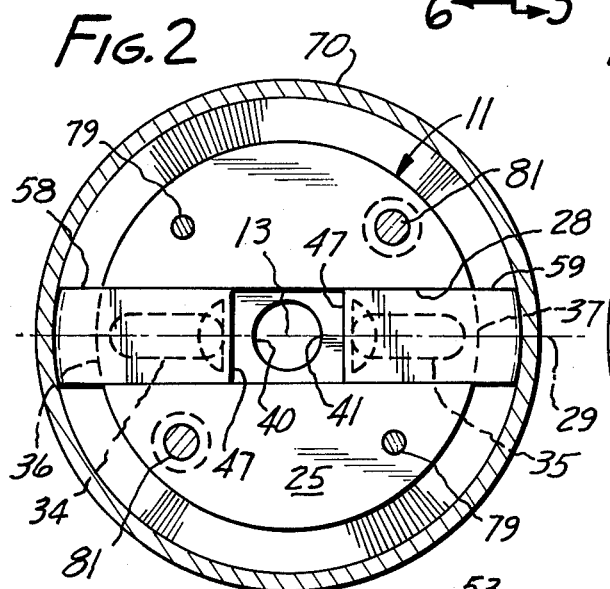
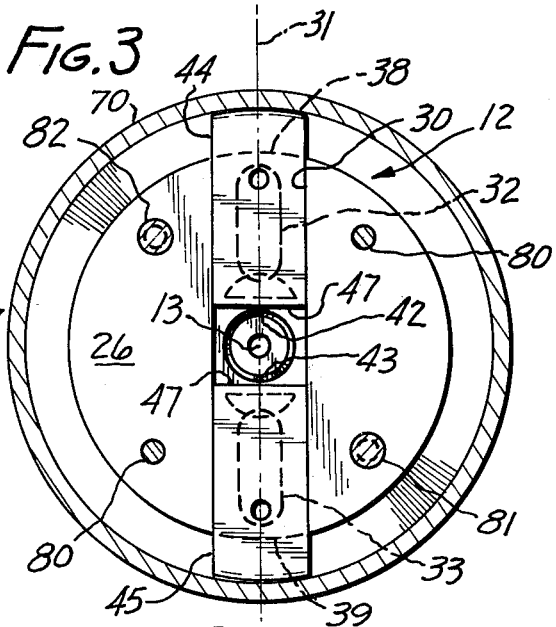
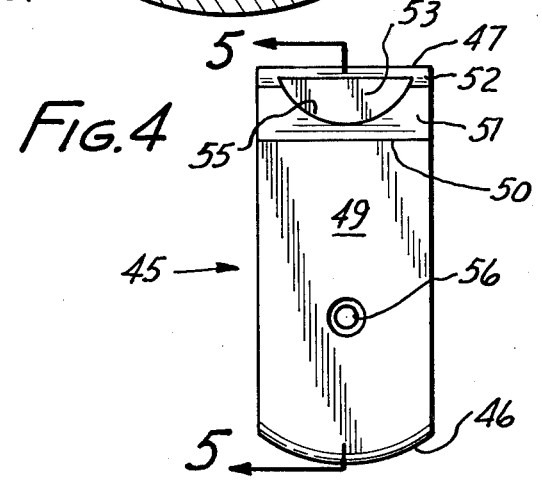
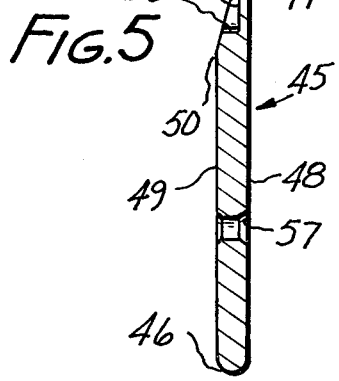

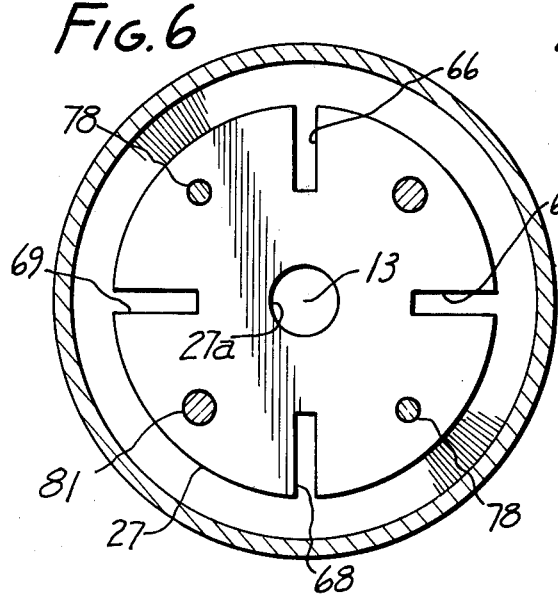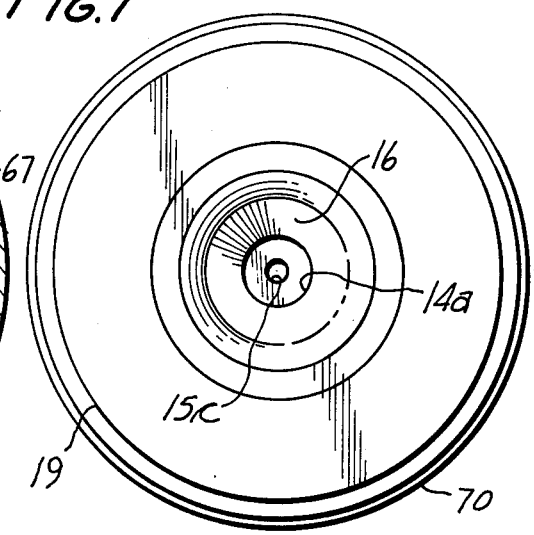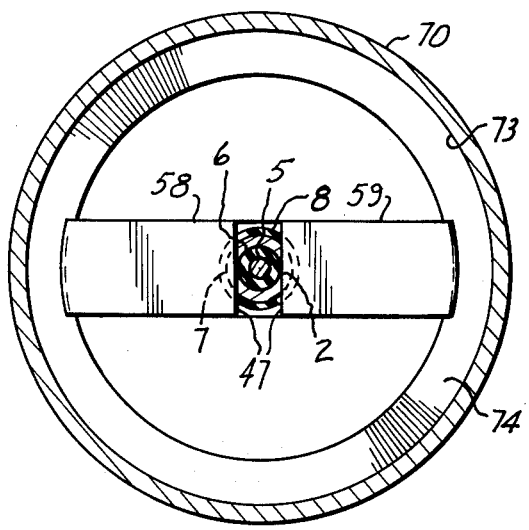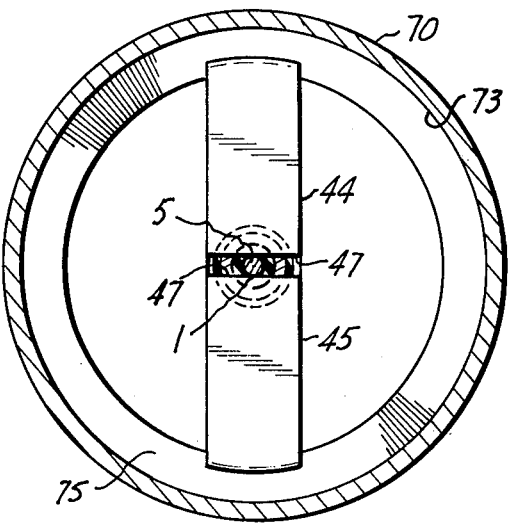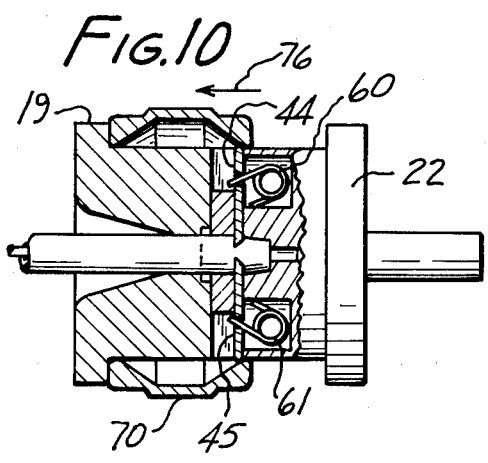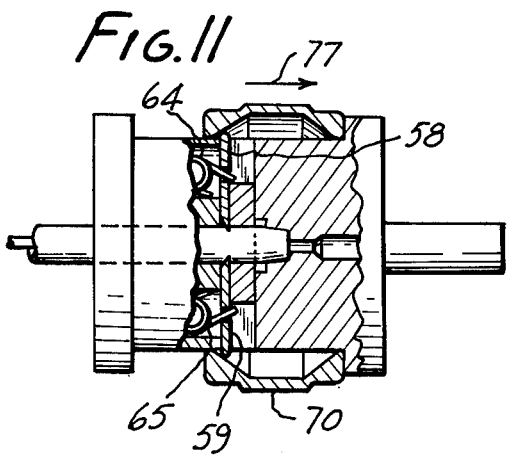

COAXIAL CABLE CUTTING TOOL

This invention relates to a tool for stripping insulation from the end of a length of coaxial electric cable in a manner to expose the conductors of the cable in preparation for attaching the conductors to an electric connecting device.

Electric cables for high frequency signal transmission such as television and other high frequency transmission systems are well-known. Such a cable commonly comprises a central conductor of circular cross-section extending along the longitudinal axis of the cable, covered by a concentric layer of insulation over which there is a second cylindrical conductor concentric with the central conductor. An insulating layer covers the outer conductor. Such coaxial cable is commonly used to connect one part of component of a high frequency sytem to another. When making such a connection by means of coaxial cable it is common practice to cut off the appropriate length of cable required for the particular connection and to expose the conductors at the severed end in such a manner that a connector may be applied to the end. Such connectors are well-known. They comprise an element making electrical contact with the central conductor and another element insulated from the first-mentioned element making electrical contact with the outer conductor.

Ordinarily all of the layers of the cable are removed from the central conductor for a short distance from its end, such as a fraction of an inch, and the outer insulation layer and outer conductor layer are commonly removed for another short distance further from the end. This renders both conductors accessible to the connector. The removal of the layers in this manner can be tedious and time-consuming work when done manually, particularly when many such connections are to be made in a system or installation.

In accordance with the present invention a tool is provided which facilitates the cutting and stripping of the cable layers in the desired manner to make the cable conductors accessible to a typical type of connector.

The invention is carried out by provision of a rotatable housing having a central bore through which an end of coaxial cable which is to be stripped of layers in the desired manner may be inserted. Within the housing there are longitudinally spaced grooves extending transverse to the axis of the bore, and in each groove there is provided a slidable cutter means normally held out of contact with the cable within the bore. Means is provided for urging the cutter means to slide in their grooves so that cutting edges of the cutter means are pressed into cutting engagement with the outer wall of the cable while the housing is being rotated. Provision may be made for rotating the tool in a drill chuck or the like.

When the tool is rotated relative to the cable while the cutter means is pressed to cut into the cable a circumferential cut is made to a depth permitted by a limiting means. The limiting means related to one of the cutter devices is arranged so that a first cut is made through the layers of the cable to, or almost to, the outer periphery of the central conductor. The limiting means related to another of the cutting devices is arranged so that the last-mentioned cutting device after cutting through the outer insulation of the cable, does not cut substantially into the inner insulation of the cable. This second cut is ordinarily at a distance somewhat further removed from the end of the cable than the first cut.

Preferably the cutter means for each of the cuts comprises opposed cutter edges.

According to a preferred feature means is provided for actuating the cutters for each of the cuts.

Another feature resides in an arrangement of springs for urging the cutter edges to be positioned normally away from the cable.

The foregoing and other features of the invention will be better understood from the following detailed description and the accompanying drawings of which:

FIG. 1 is a side view in cross-section of a coaxial cable stripping tool according to this invention;

FIG. 2 is a cross-section view taken at line 2—2 of FIG. 1 showing cutters of the tool;

FIG. 3 is a cross-section view taken at line 3—3 of FIG. 1 showing other cutters of the tool;

FIG. 4 is a face view of one of the cutters used in the assembly of FIG. 1;

FIG. 5 is a cross-section view taken at line 5—5 of FIG. 4;

FIG. 6 is a cross-section view taken at line 6—6 of FIG. 1;

FIG. 7 is an end view looking from line 7—7 of FIG. 1;

FIG. 8 is a view showing the position of the cutters illustrated in FIG. 3 after being moved to the cutting position to make a cut through to the central conductor of the cable;

FIG. 9 is a view showing the position of the cutters illustrated in FIG. 2 after being moved to the position at which a cut is made through the outer insulation and outer conductor only;

FIG. 10 is a side view partially in cross-section showing the position of cutters of the tool in the process of making a cut through to the inner conductor in correspondence with the position of the cutters illustrated in FIG. 8;

FIG. 11 is a side view turned ninety degrees angularly relative to FIG. 10, partially in cross-section, showing the position of cutters of the tool in the process of making a cut through the outer insulation of the same section of coaxial cable illustrated in FIG. 10, the cutters in this position corresponding to the position of the cutters shown in FIG. 9;

FIG. 12 is a longitudinal cross-sectional view through a length of coaxial cable illustrating cuts made by the tool;

FIG. 13 is a longitudinal cross-sectional view of the cable of FIG. 12 after stripping off cut portions; and FIG. 14 is an end view of the stripped cable of FIG. 13.

Referring to the drawings, FIG. 12 shows a length of a typical coaxial line or cable comprising a central electrical conductor 5, a cylindrical inner layer 6 of insulating material concentrically around conductor 5, an outer cylindrical electrical conductor 7 usually of a braided conductive material concentrically around the insulation layer 6, surrounding the outer conductor 7. It is a common practice to electrically connect such a length of cable to another cable or component, and in order to do this it is common to strip off the layers around the end of the central conductor 5 to bare it for a distance of the order of about a quarter to half an inch, and also to strip off the material around the inner insulation 6 for an additional short distance from the end. Thus by making a circumferential cut as indicated by line 1 as far as, or nearly as far as, the outer surface of the inner conductor, the material of layers 6, 7 and 8 may be stripped off to the right in FIG. 12 thus leaving bare the part of conductor 5 to the right of line 1. By making another circumferential cut as indicated by line 2 as far as the outer surface of inner insulation 6 the part of outer insulating layer 8 and outer conductor 7 remaining to the right of line 2 can be stripped off to the right, exposing the part of inner insulation 6 remaining to the right of line 2. A suitable connector for attachment to these conductors 5 and 7 may then be fixed at this cable end in a well-known manner. The stripping tool shown in FIGS. 1 through 11 is capable of performing this cutting and stripping operation in an efficient manner, making the cable ready for attachment to a suitable connector.

Referring to FIGS. 1 through 11 there is shown a stripping tool 10 adapted to make cuts through concentric layers of coaxial cable outside of the central conductor for the purpose of stripping the outside concentric layers in a desired manner. The tool comprises two bodies 11 and 12, the outer surfaces of which are cylindrical and of the same diameter, and concentric around a common axis 13. A bore 14 is formed through body 11 along this axis and a bore 15 is formed through body 12 along the same axis. Bore 14 is provided at its end remote from bore 15, with an outwardly flaring section 16 to facilitate the admission into the bore of a length of coaxial cable to be stripped. Bore 15 has a section 15a at its position nearest bore 14, and aligned with bore 14, of substantially the same diameter as the inner section 14a of bore 14. Bore section 15a is stepped radially inwardly to provide a shoulder 15b against which the length of coaxial cable introduced into it through bore 14 will abut. Thus the next section 15c of bore 15 is of smaller diameter than section 15a, and beyond section 15c the bore 15 enlarges to a section 15d extending to its outer end remote from bore 14, this outer end being internally threaded at 15e for a purpose described hereafter. Although the wall of bore section 15a may be made exactly cylindrical it has been found preferable that it have a slight taper toward the axis 13 in the direction of bore section 15d so that it makes a conical angle with the axis of the order of about five degrees. This will help center the cable particularly in the case of irregularity of cable dimensions.

The outer end of body 11 is provided with an annular stop ring 17 fitted against a shoulder 18 of body 11 and having an outer periphery 19 of a diameter greater than the outer periphery 20 of the portion of body 11 located inward from stop ring 17. Stop ring 17 is secured in position by a set screw 17a. The body 12 is provided with a stop ring 21 integral with body 12 and having an outer periphery 22 of the same diameter as the outer periphery 19 of stop ring 17, this being greater than the diameter of the outer periphery 23 of the portion of body 12 inside stop ring 21. There extends outwardly from the exterior of the end surface of stop ring 21 a hollow cylindrical stem or neck 24 providing the wall through which the section 15d of bore 15 extends. The purpose of the stop rings 17 and 21 is explained hereafter.

The inner flat face 25 of body 11 is juxtaposed to the inner flat face 26 of body 12 and faces 25 and 26 are separated from each other by a disc-like spacer 27 having a central, axial bore 27a of the same diameter as bores 14a and 15a of bodies 11 and 10, as best seen in FIG. 6. Bores 14a, 27a and 15a are coaxial with each other. There is formed in the inner face 25 of body 11, a groove 28 which extends along a diameter 29 of body 11 as best seen in FIG. 2. The sides of the groove are perpendicular to the plane of inner face 25 and the base of the groove is parallel to the plane of face 25. Thus the diameter 29 for this groove passes perpendicularly through the axis 13. The inner face 26 of body 12, best seen in FIG. 3, is provided with a groove 30 identical in dimensions and shape to groove 28 in face 25, but oriented along the diameter 31 of face 26 which is perpendicular to diameter 29 of groove 28. Diameter 31 passes perpendicularly through axis 13.

At the base of groove 30 there are formed two slots 32 and 33 aligned with each other along diameter 31 and spaced equidistant from the central axis 13. The narrow dimension of each of these slots 32 and 33 is less than the width of groove 30 and their depth extends only partway through body 12. Groove 28 of body 11 is provided with a pair of slots 34 and 35 aligned along diameter 29 and of the same dimensions as those of slots 32 and 33. The distance of slots 34 and 35 from central axis 13 is also the same as the distance of slots 32 and 33 from the central axis.

With the opposite faces of spacer 27 positioned flush with the respective faces 25 and 26 of the bodies, as seen in FIG. 1, the grooves 28 and 30 become closed by the spacer except at positions 36 and 37 at the periphery of body 11 and positions 38 and 39 at the periphery of body 12, and also at positions 40 and 41 at the central bore 14a and positions 42 and 43 at the central bore 15b.

Two cutters 44 and 45 are positioned in groove 30. One of these cutters 45 is illustrated in FIGS. 4 and 5. It comprises a short strip of a hard material such as tool steel rounded at one end 46 and provided with a cutting edge 47 at the opposite end. The face 48 at which the cutting edge is formed is flat throughout its entire extent from the cutting edge to the rounded edge 46. Its opposite face 49 is also flat and parallel to face 48 from the rounded edge 46 to the location 50 of a bevel 51 which slants toward the cutting edge 47 to meet a second bevel 52 which extends to the cutting edge. A cut-out 53 is formed slightly back from the cutting edge 47 by a cut 54 formed at bevels 51 and 52, parallel to face 48 and terminating at an arcuate shoulder 55. The radius of the arc 55 is such that this arcuate shoulder will accommodate the part of the coaxial cable to be cut by the cutter, as will be explained in more detail hereafter.

A hole 56 is formed through the cutter blade at its central axis at a position somewhat closer to rounded edge 46 than to cutting edge 47, and preferably this hole is provided with bevels 57 at the two faces of the cutter blade. The dimensions of the cutter blade are such that when the tool is assembled as shown in FIG. 1 with the spacer fitted between the bodies 11 and 12, the cutter blade 45 snugly but slidably fits within the groove, and the end having the rounded edge 46 protrudes outward beyond the periphery of bodies 11 and 12 when the cutting edge is at the inner wall of the central bore 27a of spacer 27.

All of the cutters in the tool are made with the same dimensions. Cutters 44 and 45 are positioned in groove 30 so that the cutting edges 47 are juxtaposed to, but spaced from, each other, and furthermore the sides 48 of cutter blades where the cutting edges are located are positioned to face toward the body 11. There are fitted into groove 28 of body 11 two cutters 58 and 59, each of which is identical to cutter 45 shown in FIGS. 4 and 5.

And these are positioned in the groove with the cutter blade faces 48 facing toward body 12 and with their cutting edges 47 juxtaposed to, but spaced from, each other.

For the purpose of normally maintaining the four cutters positioned in their respective grooves so that the cutting edges do not extend into the bores 14a, 15a or 27a, there are provided four identical coiled springs of which springs 60 and 61 (for attachment to respective cutters 44 and 45) are seen in FIG. 1. Each coiled spring has a shorter end 62 and a longer end 63. The shorter end bears against the inner end of a respective one of the slots (of which slots 32 and 33 are seen in FIG. 1), and the longer end 62 passes through the hole 56 through the respective adjacent cutter, as seen in FIG. 1 in the case of cutters 44 and 45.

The springs for the cutters at groove 28 in body 11 cannot be seen in FIG. 1, but they are seen in FIG. 11 as springs 64 and 65. The force of all four springs tends to urge the respective cutter blades to slide radially outwardly in the respective grooves. For the purpose of maintaining the springs in their desired normal position as illustrated in FIG. 1, the spacer 27 is provided with four slots 66, 67, 68 and 69 spaced angularly equi-distant from each other and extending from a position at the periphery of the spacer radially inwardly toward the central axis 13 for a distance which may be about halfway from the periphery to the bore 27a. The long end 63 of each of the four coiled springs is long enough to extend into a respective one of these four slots of the spacer as best seen in FIG. 1.

The outward movement of the cutters through their grooves is limited by the presence of a cutter actuating race 70 shaped in the general form of an annular ring which fits over the periphery of the bodies 11 and 12. The inner surfaces of the two ends 71 and 72 of the race 70 have a sliding fit over the outer peripheries of the respective bodies 11 and 12, but are of insufficient diameter to pass the stops 19 and 22. In the region between the ends 71 and 72, the ring is shaped to have a larger diameter at its central region 73 than at the edges 71 and 72. The inner surfaces 74 and 75 at opposite sides of the central region 73 are conical or oblique with reference to the central axis 13. The forces of the four springs 60, 61, 64 and 65 cause the outer rounded surfaces 46 of each of the cutters to push against the inner surface of ring 70. This will act to maintain the ring positioned over the bodies 11 and 12 so that the edges 71 and 72 of race 70 are maintained at a significant distance away from their adjacent stops 19 and 22. If, for example, the cutter actuating race should be slid longitudinally toward one of the stops the effect would be to cause the outer edges of two of the cutters, for example cutters 44 and 45, to cam against oblique surface 75 to urge the race back to its normal position shown in FIG. 1. If the race were slid toward the other stop, the outer edges of the other cutters 58 and 59 would cam against oblique surface 74, with a similar result.

To aid in the assembly of the tool a pair of diametrically opposite dowel pin holes 78 are formed through the spacer 27 and these are aligned with diametrically opposite bores 79 of the same diameter extending partway into body 11 from its inner face 25 and also with diametrically opposite bores 80 of the same diameter extending partway into body 12 from its inner face 26. By inserting dowel pins in the holes 80 and then mounting the spacer 27 with the dowels through its holes 78 (after putting the springs 60 and 61 and the cutters 44 and 45 in place) and then mounting the body 11 with the dowel pins in its bores 79 (after putting the springs 64 and 65 and cutters 58 and 59 in place), this assembly is held together by screws 81 passed through diametrically opposite holes through body 11 and aligned holes of the same diameter through spacer 27 and into threaded bores 82 of body 12. Then after putting the race 70 in position the stop 17 is put in place and held by set screw 17a.

The configuration of the inner surfaces 73, 74 and 75 of the race relative to the cutters is such that when the race is in its normal position shown in FIG. 1 with the rounded edges of all four of the cutters bearing against race surface 73 under the urging of their respective springs, all the cutting edges are separated far enough to permit the passage of a length of coaxial cable inserted through the flaring section 16 of body 11 and through bores 14a, 27a and 15a to pass between the cutters without interference from the cutting edges and without being cut. But when the race 70 is pushed axially toward the left in the direction of arrow 76 as shown in FIG. 10 while the tool is being rotated and while the length of cable is inserted into the tool and abutting the stop 15b, the action of the camming surface 75 against the rounded edges of cutters 44 and 45 will cause their cutting edges to move toward each other and make a circumferential cut into the outer insulation of the cable. This cut will deepen as the race is pushed further toward the left and will continue until the end 71 of the race abuts the stop 19. This cut, herein referred to as the first cut, is illustrated in FIG. 10 which shows the cutters 44 and 45 slid inwardly in their groove against the pressure of springs 60 and 61 with their cutting edges in the closest proximity permitted by the limiting stop 19 of the tool. This cut is also indicated by the line 1 in FIG. 12. In this innermost position of the cutting edges the cutters have cut through all of the layers of the cable except the central conductor 5, at the surface of which the approach of the cutting edges to each other has been caused to discontinue due to the stop 19. Preferably the approach of cutters 44 and 45 toward each other is stopped very slightly short of central conductor 5 to be certain of not nicking its outer surface, which would be undesirable. In this position of the race the springs 60 and 61 are urging the cutters 44 and 45 to move the race back to its central or neutral position but the other cutters 58 and 59 being in contact with region 73 of the race, are not urging the race to slide in either direction. Hence when the race is released, the race moves back to its normal position.

If now the race is pushed in the direction of arrow 77 as shown in FIG. 11, the cutters 58 and 59 will be cammed by surface 74 of the race to move the cutting edges of these cutters toward each other to cut into the cable. The relationships are such that when the race has reached stop 22 the cutting edges of cutters 58 and 59 have cut through the outer layer 8 of insulation and also through the outer conductor layer 7 as indicated by line 2 in FIG. 12, but have not cut substantially into insulation layer 6, if at all. This cut is herein referred to as the second cut. The cut-outs 53 with their arcuate shoulders 55 serve to thin the cutting edges, and also have large enough dimensions to accommodate the cable material at the cut being performed by the cutting edges.

If now the cutter race is released allowing it to return to its neutral position, thereby retracting all the cutters, the cable is then removed. The cut material is then removed by simply grasping it between the thumb and forefinger with a simple twist and pull. This stripped-off material will comprise all of the layers outside the central conductor to the right of line 1 in FIG. 12 and also the outer insulation layer 8 and outer conductor layer 7 to the right of line 2 in FIG. 12. The end of the cable thus stripped is shown in FIGS. 13 and 14. Thus, the end part of the central conductor is bared for a short distance from the end of the conductor, for example about a quarter to a half inch. The cylindrical outer conductor 7 which remains after the stripping is covered by outer insulation 8 but its circular end is exposed as best shown in FIG. 14. This is a condition of the cable desired for attachment of a commonly used type of connector. Since a connector is no part of this invention, it is not illustrated. As is well-known, such a connector comprises an element which contacts the bared end of conductor 5 and second element, insulated from the first mentioned element, of a cylindrical shape which is wedged between insulation 6 and conductor 7. A member crimped around the cable binds the second element against the conductor 7, making good electrical contact.

A hole 83 is formed through the stop portion of body 12 from the exterior into bore 15 for application of a blower for occasional clean-out of insulation particles which may remain after a number of cutting operations. To facilitate this blowing, a set screw 84 is threaded into threads 15e to prevent air blowing out past these threads.

From the foregoing description the operation of the tool becomes apparent. The cable to be stripped will be inserted into the tool up to the stop 15e and the tool rotated, preferably by placing its neck 24 in a power tool such as a drill chuck. The race 70 can be held by hand against rotation during rotation of the tool and moved first to the left as shown in FIG. 10 to complete the first cut and then moved to the right as shown in FIG. 11 to complete the second cut, after which the cut cable is removed to strip the cut parts.

This invention is not to be limited by the embodiments shown in the drawings and described in the description, which are given by way of example and not of limitation, but only in accordance with the scope of the appended claims.

I claim:

1. A tool for cutting material from cable of the type having a central conductor concentrically within insulation material, said tool comprising:
    a rotatable housing having an axis of rotation and having a bore extending along said axis from one end of the housing at least part way through the housing toward its other end, into which there may be inserted a length of the cable, and having a peripheral wall between the ends;
    a first groove means and a second groove means each extending through the housing in a direction transverse to said axis and opening into the bore;
    spacing means between the first and second groove means separating the first and second groove means axially from each other;
    first cutter means slidable in said first groove means and second cutter means slidable in said second groove means, each of said cutter means containing cutting edge means positioned so that each cutting edge means may be moved from a normal position away from the bore to a position within the bore where it can cut into a cable within the bore;
    means urging each of said cutter means to slide in the direction which maintains its cutting edge means away from the bore;
    movable means attached to the housing adapted to separately slide each of said cutter means against the force of said urging means so that its cutting edge means moves into the bore to cut into material of the cable when the housing is rotated relative to the cable; and
    means on the housing limiting the movement into the bore of the cutting edge means of each cutter means;
    whereby when the housing is rotated relative to a length of cable inserted in the bore there are made two axially separated peripheral cuts through the wall of the cable, the depth of each cut being established by the limiting means.

2. A tool according to claim 1 in which said movable means adapted to separately slide each of said cutter means comprises a movable race outside said housing periphery.

3. A tool according to claim 2 in which each cutter means protrudes outside the periphery of the housing where it comes into contact with the race, and said race contains means for sliding the respective cutter means toward the bore when the race is moved.

4. A tool according to claim 1 in which the first and second groove means are at an angle to each other.

5. A tool according to claim 4 in which the angle is 90°.

6. A tool according to claim 1 in which each cutter means comprises two opposed cutters in the respective groove means.

7. A tool according to claim 1 in which the urging means comprises spring means.

8. A tool according to claim 2 in which the means limiting the movement of each cutting edge means comprises stop means in the path of movement of the race.

9. A tool according to claim 8 in which the race is movable axially in either direction from a neutral position, and said race contains a surface which slides the first cutter means in the first groove means when the race is moved in one direction and contains another surface which slides the second cutter means in the second groove means when the race is moved in the other direction.

10. A tool according to claim 9 in which the stop means comprises a stop at the exterior of the housing at each side of the race.

11. A tool according to claim 6 in which each cutter contains a groove with an arcuate shoulder to accommodate material of the cable while the cutter is making a cut.

12. A tool according to claim 1 in which the housing comprises two bodies and the spacing means comprises a spacer between the two bodies.

13. A tool according to claim 12 in which the opposite sides of the spacer form walls of the first and second groove means.

14. A tool according to claim 13 in which the spacer contains slots and the means urging the respective cutter means to slide comprise coiled springs an end of each of which extends through a respective cutter means into a respective one of the slots.

15. A tool according to claim 14 in which the housing contains slots at opposite sides of the spacer and each spring is placed in a respective one of the last-mentioned slots.

16. A tool according to claim 1 in which said limiting means is positioned relative to the respective cutting edge means to allow one of the cutting edge means to move closer to said axis than the other cutting edge means so that one of the cuts can be made deeper than the other.

* * * * *